April 2, 1929.　　　　R. DAWSON　　　　1,707,904
PIPE JOINT
Original Filed May 22, 1925
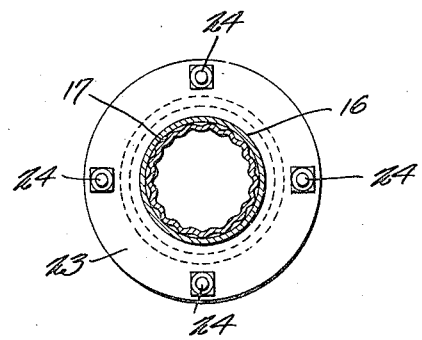
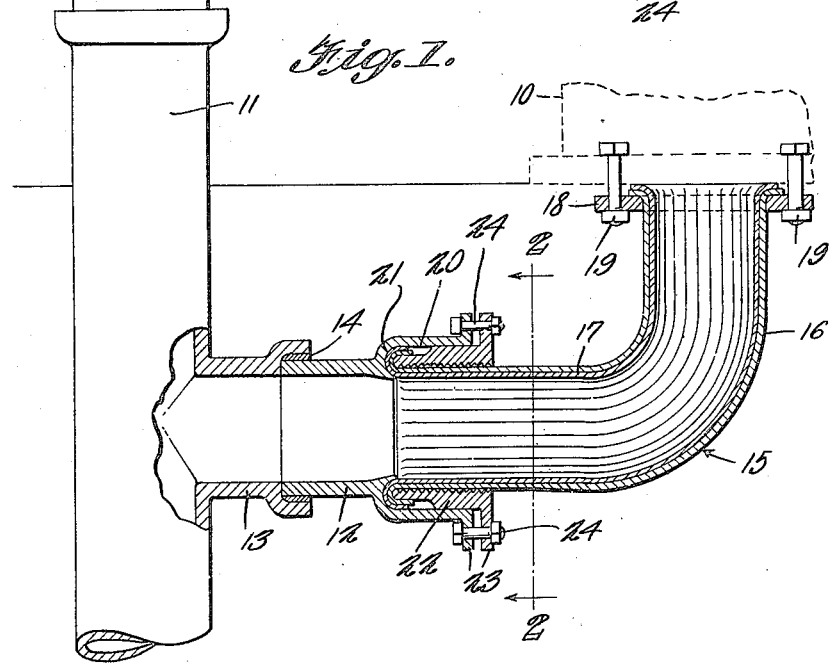
Robert Dawson,
INVENTOR
BY Victor J. Evans
ATTORNEY
WITNESS:
P. T. Hickey.

Patented Apr. 2, 1929.

1,707,904

UNITED STATES PATENT OFFICE.

ROBERT DAWSON, OF SKILLMAN, NEW JERSEY.

PIPE JOINT.

Original application filed May 22, 1925, Serial No. 32,170. Divided and this application filed November 28, 1925. Serial No. 72,014.

This invention relates to improvements in waste pipe connections especially designed for toilets, bath tubs, basins, sinks and the like and is a division of the subject matter disclosed in my copending application Serial No. 32,170, filed May 22, 1925.

An object of the present invention is to provide a flexible pipe which is especially adapted for the above use so as to permit of expansion and contraction and also resist the action of waste matter passing through the pipe.

While it is old to provide a pipe with a lining, it is believed novel to provide a lead pipe with a lining of tinned, preferably corrugated copper, so that the pipe may be bent into a desired shape; will expand and contract under varying temperatures to prevent damage, and will resist the action of waste matter as above stated, so that it is especially adapted for the purpose specified.

With the above and other objects in view, the invention further includes the following novel features and details of construction, to be hereinafter more fully described, illustrated in the accompanying drawings and pointed out in the appended claim.

In the drawings:—

Figure 1 is a view partly in section and partly in elevation illustrating a waste pipe connection with the invention in use.

Figure 2 is a section on the line 2—2 of Figure 1.

Referring in detail to the drawings wherein like characters of reference denote corresponding parts, the reference character 10 indicates a portion of a toilet bowl illustrated by dotted lines, while 11 indicates a portion of a soil or waste pipe to which the bowl is connected. This connection is effected by the use of a ferrule 12 of brass or other suitable material which has one of its ends joined with an extension or hub 13 carried by the soil pipe 11, the joint being calked as indicated at 14. The opposite end of the ferrule 12 is connected to one end of a flexible pipe section 15, the opposite end of the latter being connected with the outlet of the bowl 10.

This flexible pipe section is of novel construction and comprises an outer lead casing 16 and an inner lining 17, the latter preferably consisting of tinned copper and having longitudinally extending corrugations therein. This lining will resist the action of acids contained within the waste matter passing through the pipe, which acids frequently cause a lead pipe section to become crystalized or porous. The lead casing is thus protected and its advantages for connections of this kind retained as it is easier to cut and makes a much better and snug fitting connection than other materials. By corrugating the lining 17 expansion and contraction is provided for.

Connection with the bowl 10 is effected by bending the pipe 15 in elbow configuration and clamping the same to the bottom of a bowl by means of an annulus 18 and bolts 19.

Connection between the ferrule 12 and the flexible pipe section 15 is effected by providing an enlarged bore 20 at the outer end of the ferrule and forming a transversely curved annular seat 21 at the inner end of this enlarged bore. Surrounding the adjacent end of the flexible pipe section 15 is a clamping collar 22 and the extremity of the pipe section 15 is turned over the inner end of this collar. The collar 22 and the adjacent end of the ferrule 12 are both provided with flanges 23 which receive bolts 24. By adjusting these bolts the collar 22 is forced inward to force the outwardly turned extremity of the pipe section 15 within the seat 21 so that a leakproof joint is provided. If desired, a gasket may be interposed between the flanges 23.

The bore of the sleeve 22 is preferably threaded so that in the event the bowl is disconnected, a threaded plug may be threaded into the sleeve to close the end of the ferrule.

It will be seen from the foregoing description and accompanying drawings that the invention provides a lead pipe section which may be bent into a desired shape and which is provided with a tinned, thin copper lining (preferably corrugated) which may also be bent into shape so as to conform to the shape of the lead pipe and which, due to its inherent qualities and its corrugated formation, will correspondingly expand and contract.

The invention is susceptible of various changes in its form, proportions and minor details of construction and the right is herein reserved to make such changes as properly fall within the scope of the appended claim.

Having described the invention what is claimed is:—

A waste pipe elbow comprising an outer pipe member formed of lead, an inner lining therefor longitudinally corrugated and formed of tinned copper, the end edges of the outer pipe and the lining being outwardly curved to provide seats adapted for cooperation with coupling means.

In testimony whereof I affix my signature.

ROBERT DAWSON.